US008562209B2

(12) United States Patent
Yu et al.

(10) Patent No.: US 8,562,209 B2
(45) Date of Patent: Oct. 22, 2013

(54) METHOD TO CONTROL THE WORK OF ELECTRONIC THERMOMETER BY USING THE POSITION OF PROBE AND THE APPARATUS COMPOSED OF

(75) Inventors: Zhidong Yu, Nanshan Shenzhen (CN); Lingfeng Kong, Nanshan Shenzhen (CN); Zhao Qin, Nanshan Shenzhen (CN)

(73) Assignee: Edan Instruments, Inc. (CN)

( * ) Notice: Subject to any disclaimer, the term of this patent is extended or adjusted under 35 U.S.C. 154(b) by 1109 days.

(21) Appl. No.: 12/494,788

(22) Filed: Jun. 30, 2009

(65) Prior Publication Data

US 2010/0329303 A1 Dec. 30, 2010

(51) Int. Cl.
  *G01K 7/00* (2006.01)
  *G01K 1/00* (2006.01)

(52) U.S. Cl.
  USPC ........... 374/164; 374/163; 374/183; 374/141; 374/198; 374/208

(58) Field of Classification Search
  USPC ......... 374/100, 120, 141, 163, 164, 183, 185, 374/208, 206, 121, 179, 198–200; 600/549, 600/474
  See application file for complete search history.

(56) References Cited

U.S. PATENT DOCUMENTS

| | | | | |
|---|---|---|---|---|
| 2,875,614 A * | 3/1959 | Dobrin et al. | | 374/203 |
| 3,402,378 A * | 9/1968 | Shew et al. | | 338/28 |
| 3,704,705 A * | 12/1972 | Eckhart | | 600/549 |
| 3,905,232 A * | 9/1975 | Knute | | 374/158 |
| 3,929,018 A * | 12/1975 | Turner | | 374/158 |
| 4,444,990 A * | 4/1984 | Villar | | 136/221 |
| 4,626,643 A * | 12/1986 | Minet | | 219/712 |
| 4,842,419 A * | 6/1989 | Nietert | | 374/145 |
| 5,193,912 A * | 3/1993 | Saunders | | 374/179 |
| 5,293,877 A * | 3/1994 | O'Hara et al. | | 600/549 |
| 5,340,215 A * | 8/1994 | Makita et al. | | 374/121 |
| 5,520,048 A * | 5/1996 | Traina et al. | | 73/335.06 |
| 6,193,414 B1 * | 2/2001 | Balzano | | 374/208 |
| 6,220,749 B1 * | 4/2001 | Wyker | | 374/141 |
| 6,495,806 B2 * | 12/2002 | Siefert | | 219/494 |
| 6,561,121 B1 * | 5/2003 | Rose | | 116/216 |
| 7,075,442 B2 * | 7/2006 | Lion et al. | | 340/584 |

(Continued)

FOREIGN PATENT DOCUMENTS

DE 3620246 A1 * 12/1987
WO WO 2006048579 A2 * 5/2006

*Primary Examiner* — Gail Verbitsky
(74) *Attorney, Agent, or Firm* — Garcia-Zamor IP Law; Ruy M. Garcia-Zamor

(57) ABSTRACT

The invention discloses a method to control the work of electronic thermometer by using the position of probe. The probe incased in a disposable sheath, wherein the pre-heating mechanism in the probe and the control switch is connected with the host of the electronic thermometer by wires; and by using the axial reciprocating motion of the probe to trigger the control switch to initiate the electronic thermometer. When using the invention, we use the movement for the assembling of the sheath to initiate the hearting process and measurement, to ensure that the disposable sheath is assembled on the probe, and then execute the measurement, so as to eliminate the possibility of cross infection completely. The invention also exempts the requirement for the users to the return back of the probe into the cavity after use, and brings convenience for the users: Meanwhile, the equipment structure is simple, and the machinery assembles are few by comparison, which effectively decrease the production cost.

5 Claims, 4 Drawing Sheets

(56) References Cited

U.S. PATENT DOCUMENTS

| | | | |
|---|---|---|---|
| 7,272,983 B2 * | 9/2007 | Caderas | 73/866.5 |
| 7,828,743 B2 * | 11/2010 | Fraden | 600/549 |
| 7,938,783 B2 * | 5/2011 | Fraden | 600/549 |
| 8,029,188 B2 * | 10/2011 | Park | 374/141 |
| 8,162,537 B2 * | 4/2012 | Ma et al. | 374/158 |
| 8,162,541 B2 * | 4/2012 | Rose et al. | 374/183 |
| 8,282,277 B2 * | 10/2012 | Guo et al. | 374/208 |
| 2008/0127684 A1 * | 6/2008 | Rudduck et al. | 70/77 |
| 2010/0040112 A1 * | 2/2010 | Huck et al. | 374/183 |
| 2010/0202489 A1 * | 8/2010 | McWilliams | 374/163 |

* cited by examiner

METHOD TO CONTROL THE WORK OF ELECTRONIC THERMOMETER BY USING THE POSITION OF PROBE AND THE APPARATUS COMPOSED OF

TECHNICAL FIELD

The invention relates to an electronic thermometer detection device, especially refers to an pre-heating type of body temperature detection device, more specifically to an method to trigger the work after pre-heating by using the position of the probe and the electronic thermometer composed by this method.

BACKGROUND ART

With the current development of the medical technology and the improvement of the medical level, the needs for human body temperature measurement are increasing with a large number in our society, especially the device for the rapid measurement of body temperature. Usually, the probe incased in a disposable sheath to prevent the cross infection in measurement. Meanwhile, in order to improve the speed and the accuracy of the measurement, the rapid body temperature detection device will initiate to pre-heat the temperature of the probe; and to ensure the pre-heating time and the temperature for heating, usually we will detect the position of the probe to determine whether to initiate the heating process. Such as the American patent with a patent number of U.S. Pat. No. 7,021,824B2 disclosed a temperature detector, by using two methods of mechanical switch and optical probing to detect the position of the probe, the heating will be initiated only when the foresaid two switches detect the position that in accordance with the specific requirements. However, the structure of the current technology is more complicated more components for machinery assembly, with high production cost. In addition, the method of the current technology could not guarantee that the user must plug the disposable sheath to execute the measurement, which leads to the failure to fulfill the purpose of preventing cross infection, and brings inconvenience in using, and also brings forward new requirements for the industry.

Contents of the Invention

The aim of the invention is to use the thermometer probe position with a disposable sheath to initiate the pre-heating switch, and then initiate the measurement. The device is not just detecting the position of the probe, but also ensures that the measurement could only be initiated when the disposable sheath is assembled on the probe, which eliminates the possibility of cross infection completely.

To achieve the objective above, this invention adopts the following technical solution:

A method for controlling the work of electronic thermometer by using the position of probe, including a probe unit, a host linked with the probe unit, and inside the probe unit located a probe which is able to move in an axial reciprocation motion along the probe unit; and its feature is that by using the axial reciprocating motion of the probe which incased in a disposable sheath to trigger the control switch to control electronic thermometer to work.

An electronic thermometer, including a host and a probe unit; wherein the probe unit includes a cavity and a probe; The probe with one end located inside the cavity which is able to move in axial reciprocating motion; wherein the probe has a first location that extends the longest from the cavity, and a second location that extends the shortest from the cavity; and its feature is that in the probe has a pre-heating mechanism and a control switch, and the pre-heating mechanism that connected with the probe and the control switch is connected with the host of the electronic thermometer by wires, and the reciprocating motion of the probe triggers the control switch to control electronic thermometer to work.

The foresaid control mechanism that controls the reciprocation motion of the probe, including the first spacing baffle that located inside the cavity and fixed on the probe, and the second spacing baffle that fixed inside the cavity; between the first spacing baffle and the second spacing baffle locates a spring with the same axis of the probe. A linkage button with the probe is located in the cavity in accordance with the rear end of the probe.

The foresaid preheating mechanism includes a heating resistance located inside the probe, wherein the heating resistance connected with,the host of the electronic thermometer by wires and controlled by the host.

The foresaid control switch is mechanical switch, including a breakback contact located in the cavity and a moving contact located in the probe or the first placing baffle when the probe on the second location that corresponds to the location of the breakback contact; and the closure or the departure between the breakback contact and the moving contact control the pre-heating mechanism to open or close.

The foresaid control switch is keyswitch, which is located in the inner side of the front hatch of the cavity and in accordance with the first spacing baffle; when the first spacing baffle is in the first location and will press the keyswitch, then the pre-heating mechanism, is on the off mode, while when the first spacing baffle is in the second location and will release the keyswitch, then the predicating mechanism is on mode.

The foresaid control switch is reluctance switch, where the inductive switch of the switch is fixed inside the cavity; the magnet is located in the probe or the first spacing baffle when the probe is on the second location that in accordance with the location of the inductive switch in the cavity.

The foresaid location device of the disposable sheath in the front end of the cavity, including a convex which extends in an axial direction along with the probe from the front end of cavity and in accordance with the disposable sheath; the friction force generated by the accordance of the convex and the disposable sheath is greater than the clastic force of the spring.

By adopting the above technical solution, we use the movement for the assembling of the sheath to initiate the hearting process and measurement when using the invention, to ensure that the disposable sheath is assembled on the probe, and then execute the measurement, so as to eliminate the possibility of cross infection completely. The invention also exempts the requirement for the users to the return back of the probe into the cavity after use, and brings convenience for the users; Meanwhile, the equipment structure is simple, and the machinery assembles are few by comparison, which effectively decrease the production cost.

MODE OF CARRYING OUT THE INVENTION

Figure 1:
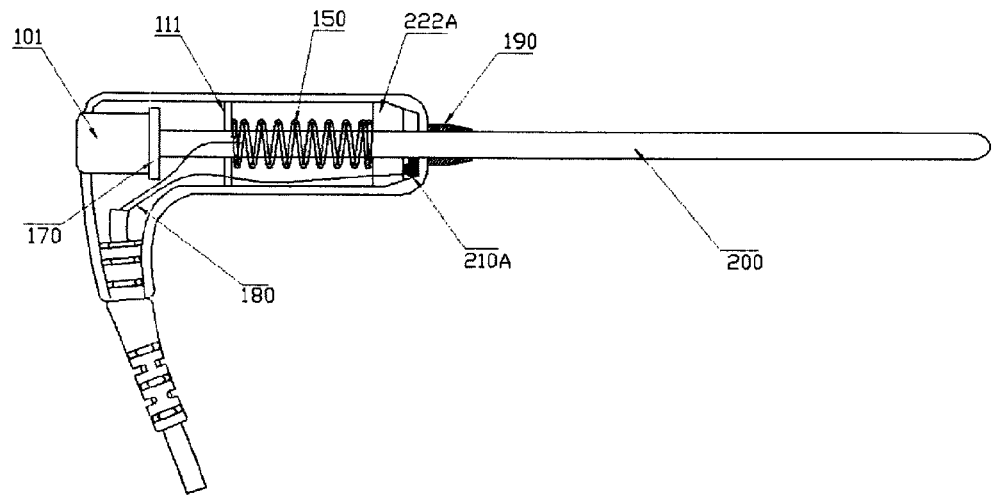
FIG. 1 is a structure figure of the probe unit of the invention.
Figure 2:
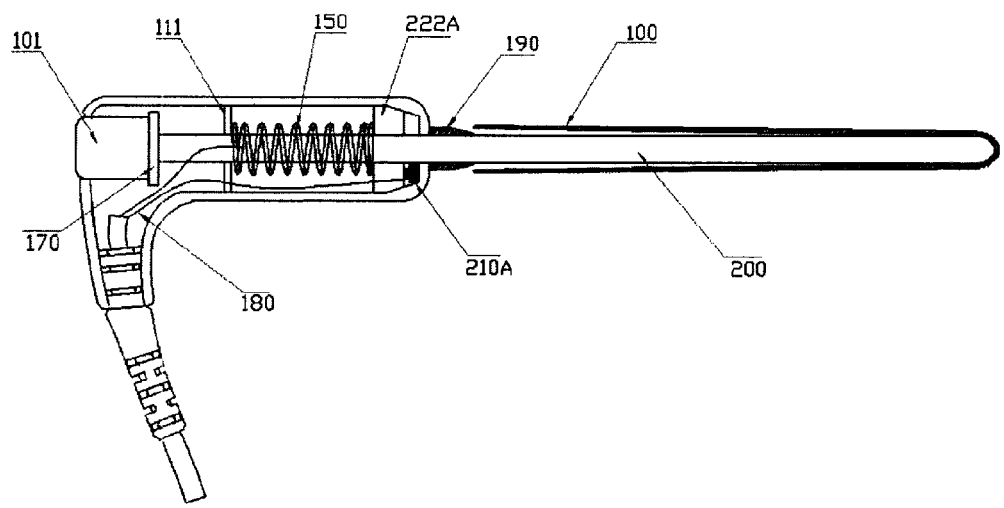
FIG. 2 is a structure figure of the probe unit without use of the invention.
Figure 3:
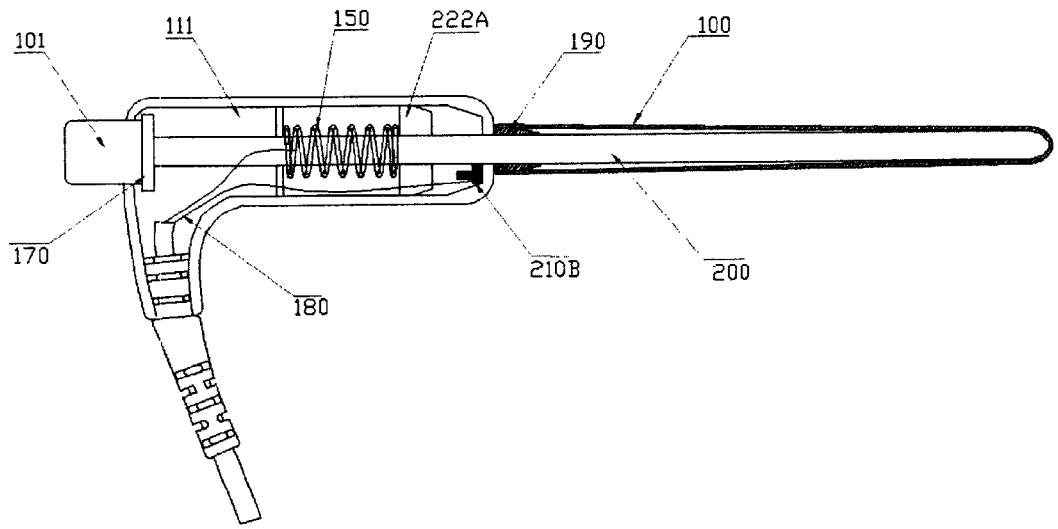
FIG. 3 is a structure figure of the probe unit in using of the invention.

Further explanation to the invention will be stated below combining with the attached figures and the mode of carrying out the invention:

The invention discloses a method for controlling the work of electronic thermometer by using the position of probe and the apparatus composed by this method; wherein by using the axial reciprocating motion of the probe incased in a disposable sheath to trigger the control switch to control electronic thermometer to work. To implement the method of the invention, the inventors provide the following optimization designs:

Therein as shown in FIG. 1 to FIG. 3 is an electronic thermometer, including a probe unit and a host (Figure not shown); wherein the probe unit includes a cavity, a probe 200 located in the cavity which is able to move in axial reciprocating motion, and a control mechanism that controls the reciprocating motion of the probe 200. The control mechanism that controls the reciprocation motion of the probe 200, including the first spacing baffle 222A that located inside the cavity and fixed on the probe 200, and the second spacing baffle 111 that fixed inside the cavity; between the first spacing baffle 222A and the second spacing baffle 111 locates a spring 150 with the same axis of the probe 200. A linkage button 101 with the probe 200 is located in the cavity in accordance with the rear end of the probe 200, and the linkage button 101 has a flange 170 to prevent it to disengage from the cavity. In the probe 200 has a pre-heating mechanism, between cavity and the probe 200 locates a control switch 210A that controls the closure or open of the pre-heating mechanism by the motion of the probe 200. A location device of the disposable sheath in the front end of the cavity, including a convex 190 which extends in an axial direction along with the probe 200 from the front end of cavity and in accordance with the disposable sheath; the friction force generated by the accordance of the convex 190 and the disposable sheath is greater than the elastic force of the spring 150. The control switch 210 is mechanical keyswitch; when the disposable sheath 100 is uncovered, the probe 200 is in the first location, and the first spacing baffle 222A that fixed in the probe 200 will press on the control switch 210A, and communicates with the host of the electronic thermometer by wire 180, and then the host of the electronic thermometer shut down the pre-heating process; When covered with the disposable sheath 100, the probe 200 is in the second location, and the first spacing baffle 222A that fixed in the probe 200 will release the control switch 210A, and communicates with the host by the probe 200 and pre-heating mechanism that connected with the host of the electronic thermometer by wire 180, and then the host of the electronic thermometer initiate the pre-heating process to rapidly increase the temperature of the probe to match with the temperature of human body or animal body and initiate the body temperature measurement; meanwhile transfer the measured body temperature to the host of the electronic thermometer to display and record. After the measurement, disengage the disposable sheath 100 from the probe, when to measure the next one, replace a new disposable sheath 100, repeat the loop In the implementation mode, we use the movement for the covering of the disposable sheath 100 in the probe 200 to control the mechanical switch, and by the control of the position of the mechanical switch to control the host to complete the proves for the body temperature measurement. In the process, the user must use the movement for the assembling of the sheath to execute the measurement, so as to eliminate or decrease the possibility of cross infection effectively.

Figure 4:
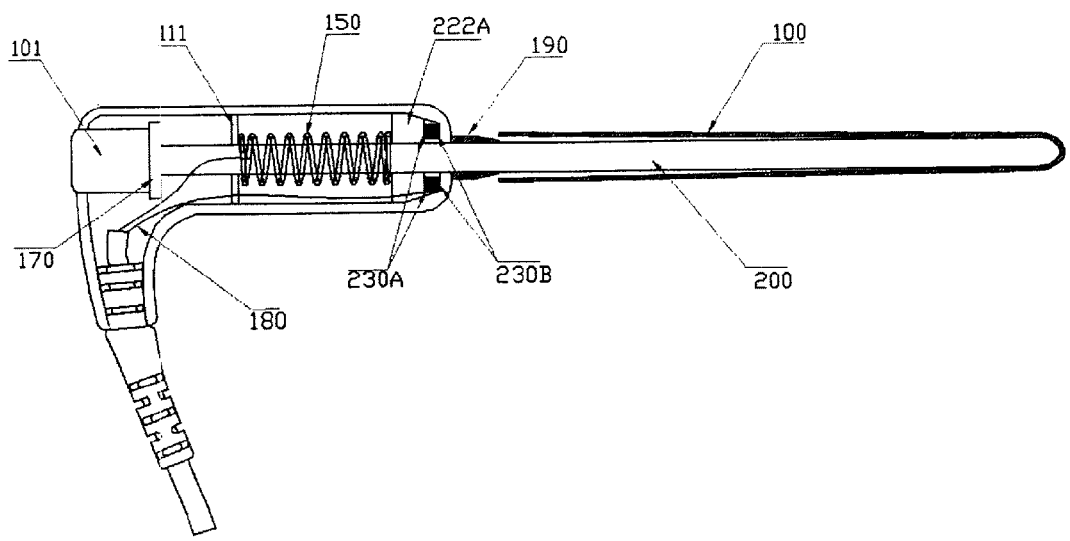
FIG. 4 is a structure figure of the probe unit without use in the second mode of the implementation of the invention.
Figure 5:
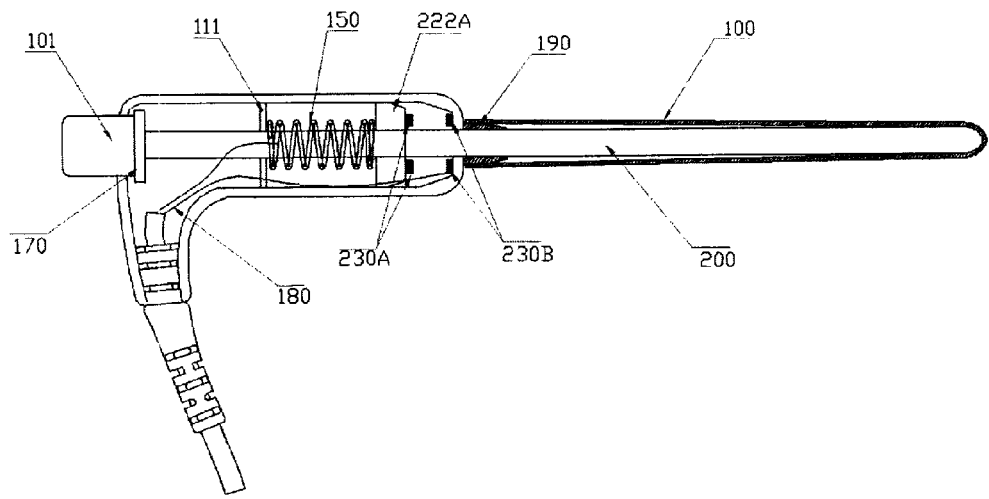
FIG. 5 is a structure figure of the probe unit in using in the second mode of the implementation of the invention.

In the second implementation mode of the invention, we use contact switch instead of mechanical switch, as shown in FIG. 4 and FIG. 5. The contact switch includes a breakback contact 230B located in the cavity and a moving contact 230A located in the probe or the first placing baffle when the probe on the second location that corresponds to the location of the breakback contact; and the closure or the departure between the breakback contact 230B and the moving contact 230A control the pre-heating-mechanism to open or close. When the foresaid disposable sheath 100 doesn't cover on the probe 200 completely, as shown in FIG. 4, the foresaid breakback contact 230A contact with the moving contact 230B, and communicates with host by wire 180, and then the host shut down the pre-heating process.

When the foresaid sheath 100 is covered in the probe 200, as shown FIG. 5, the fist spacing baffle 222A departs from the most forward location, and probe 200 moves to the second location, in the meantime, the moving contact 230A and the breakback contact 230B of the contact switch disconnect, and communicates with the host of the thermometer, and then the host initiates the pre-heating process and execute the temperature measurement.

Figure 6:
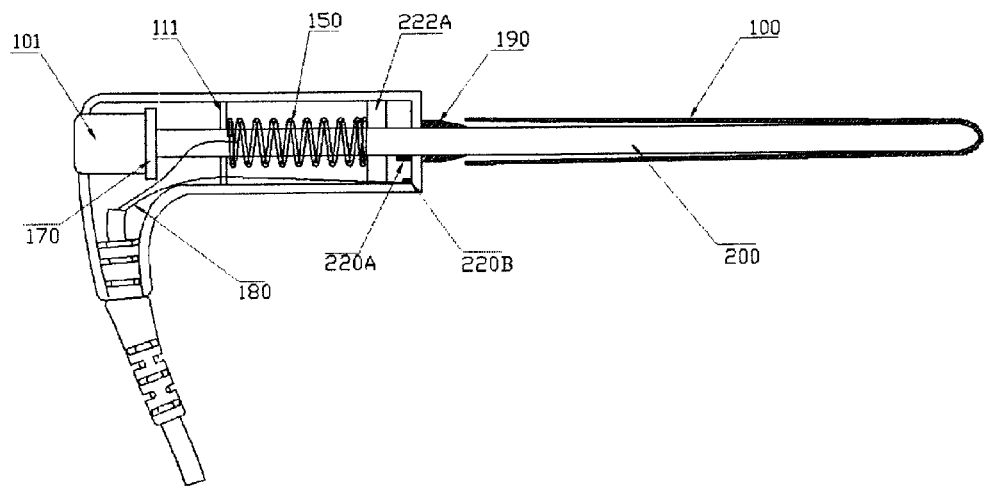
FIG. 6 is a structure figure of the probe unit without use in the third mode of the implementation of the invention.
Figure 7:
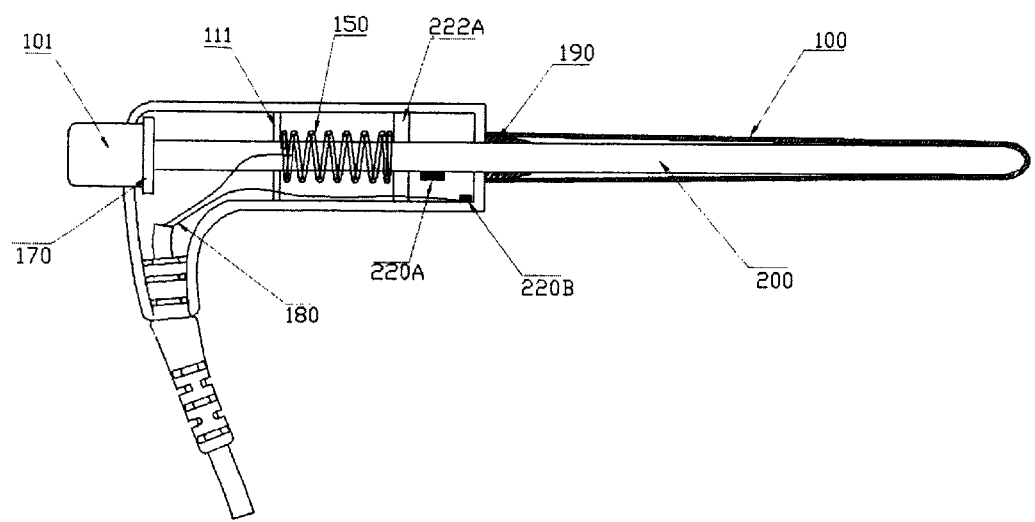
FIG. 7 is a structure figure of the probe unit in using in the third mode of the implementation of the invention.

In the third implementation mode of the invention, as shown in FIG. 6 and FIG. 7, we use the no-contact reluctance switch type to detect the position of the probe, wherein the reluctance switch is composed by the magnet 220A and the induction switch 220B. The magnet 220A is fixed at a stationary location in the foresaid probe 200, and the foresaid induction switch 220B is fixed at a stationary location inside the cavity, and the induction switch connected with the host by wire 180. The foresaid magnet 220A moves along with the probe 200, and when the foresaid probe 200 is in the first location, the magnet 220A and the induction switch 220B are directly opposite with each other, at this moment, the reluctance switch is on the off mode, and communicates with the host by wire 180, and then the host shutdown the pre-heating process. When the foresaid probe 200 is on the second location, the foresaid magnet 220A diverges from the induction switch 220B, at this moment, the reluctance switch is on the open mode, and communicates with the host by wire 180, and then the host initiates the pre-heating process.

The invention claimed is:

1. An electronic thermometer, including a host and a probe unit;

wherein the probe unit includes a cavity and a probe; the probe with one end located inside the cavity which is able to move in axial reciprocating motion; wherein the probe has a first location that extends the longest from the cavity, and a second location that extends the shortest from the cavity; and its feature is that the probe comprises a pre-heating mechanism and a control switch, and the pre-heating mechanism is connected with the probe and the control switch is connected with the host of the electronic thermometer by wires, and the reciprocating motion of the probe triggers the control switch to control electronic thermometer to work, wherein the control switch is mechanical switch, including a breakback contact located in the cavity and a moving contact located in the probe or a first spacing baffle when the probe on the second location that corresponds to the location of the breakback contact; and a closure or the departure between the breakback contact and a moving contact control the pre-heating mechanism to open or close, the first spacing baffle being located in the cavity between a linkage button and the moving contact which is also in the cavity, the linkage button being linearly aligned with the probe, the linkage button being positioned on an opposite side of the probe unit from the probe.

2. In accordance with the electronic thermometer described in claim 1, wherein a control mechanism that controls the reciprocation motion of the probe, including a first spacing baffle that located inside the cavity and fixed on the probe, and a second spacing baffle that fixed inside the cavity; between the first spacing baffle and the second spacing baffle locates a spring with the same axis as the probe, a linkage button of the probe is located proximate a cavity in a rear end of the probe and is linearly aligned with the probe, the linkage button being positioned on an opposite side of the probe unit from the probe.

3. In accordance with the electronic thermometer described in claim 1 wherein the control switch is keyswitch, which is located in the inner side of the cavity and between the inner side of the cavity and the first spacing baffle; when the first spacing baffle is in the first location and will press the keyswitch, then the pre-heating mechanism is in off mode, while when the first spacing baffle is in the second location and will release the keyswitch, then the pre-heating mechanism is in on mode, the first spacing baffle being located in the cavity proximate an end of the cavity from which the probe protrudes.

4. In accordance with the electronic thermometer described in claim 1, wherein an inductive switch of the switch is fixed inside the cavity; a magnet is located in the probe or the first spacing baffle when the probe is on the second location that in accordance with the location of the inductive switch in the cavity.

5. In accordance with the electronic thermometer described in claim 1 wherein a convex abutment is located on the probe unit opposite the linkage button and over a portion of the probe and configured to engage a disposable sheath positioned over the probe such that a friction force between the convex abutment and the disposable sheath is greater than an elastic force of the spring.

* * * * *